United States Patent

Katatani et al.

[11] Patent Number: 5,492,676
[45] Date of Patent: Feb. 20, 1996

[54] DENITRIFICATION SYSTEM

[75] Inventors: Atsushi Katatani, Kasugai; Akira Hashimoto, Sakai, both of Japan

[73] Assignees: Matsushita Electric Industrial Co., Ltd.; Matsushita Seiko Co., Ltd., both of Osaka, Japan

[21] Appl. No.: 250,241

[22] Filed: May 27, 1994

[30]  Foreign Application Priority Data

May 28, 1993 [JP] Japan .................................. 5-126938
Oct. 29, 1993 [JP] Japan .................................. 5-271998

[51] Int. Cl.⁶ .................................................. B01D 53/56
[52] U.S. Cl. ........................... 422/168; 422/170; 422/171; 423/235; 423/239.1
[58] Field of Search .................... 422/168–172, 422/186.07, 186.08, 186.10, 186.14, 193, 194, 105, 110, 111; 423/235, 235 D, 235.1; 55/385.2; 95/3, 10, 70, 129; 56/55, 74, 111

[56] References Cited

U.S. PATENT DOCUMENTS

| | | | |
|---|---|---|---|
| 3,745,751 | 7/1973 | Zey et al. | 422/186.10 X |
| 4,038,368 | 7/1977 | Atsukawa et al. | 423/235 |
| 4,551,304 | 11/1985 | Hölter et al. | 95/129 X |
| 4,640,825 | 2/1987 | Rosenberg | 423/235 |
| 4,680,040 | 7/1987 | Gooray et al. | 96/152 |
| 5,063,030 | 11/1991 | Sweetman | 422/186.07 X |
| 5,141,722 | 8/1992 | Nagashima | 422/186.07 X |

FOREIGN PATENT DOCUMENTS

| | | |
|---|---|---|
| 3731899 | 4/1989 | Germany . |
| 4132168 | 4/1993 | Germany . |
| 2-274999 | 11/1990 | Japan . |
| 5-220348 | 8/1993 | Japan . |

OTHER PUBLICATIONS

Derwent Publications Ltd. & JP-A-56 028 627 (Abstract) Mar. 1981.
Derwent Publications Ltd. & JP-A-3 233 100 (Abstract) Oct. 1991.
Derwent Publications Ltd. & JP-A-3 275 126 (Abstract) Dec. 1991.

Primary Examiner—Timothy M. McMahon
Attorney, Agent, or Firm—Panitch Schwarze Jacobs & Nadel

[57] ABSTRACT

A denitrification system comprises an electrostatic precipitator (3) in the foremost stage of the system inlet, an ozone supply nozzle (4) for an ozonizer (5) for generating ozone required for oxidizing the NO into $NO_2$, followed by a fan or an agitator (6), and an $NO_2$ absorbent filter (7) in the final stage arranged in that order. Further, this system may comprise the control of feeding back the residual $O_3$ concentration after oxidation, to achieve the higher denitrification rate.

1 Claim, 11 Drawing Sheets

DENITRIFICATION SYSTEM

FIELD OF THE INVENTION AND RELATED ART STATEMENT

1. Field of the Invention

The present invention relates to a denitrification system for processing exhaust gas of normal-temperature and low-concentration in automobile road tunnels or the like closed space.

2. Description of Related Art

In recent years, installing a denitrification system is required at a site near the exhaust tower of a car road tunnel to cope with the environmental problem of regulating the total amount or concentration of the nitrogen oxides $NO_x$ emitted from the exhaust tower.

A conventional denitrification system of such type is generally configured as shown in FIGS. 11 and 15. The configuration will be explained with reference to the drawings.

The $NO_x$ contained in the tunnel exhaust gas drawn by a fan 103 includes NO and $NO_2$ as main components, of which NO is oxidized into $NO_2$ by a high-voltage discharge ionizer 101, as shown in FIG. 11. The $NO_2$ obtained by oxidation and the $NO_2$ originally existing in the $NO_x$ are absorbed by an $NO_2$ absorbent filter 102 containing activated carbon and alkali.

Also, as shown in FIG. 15, the tunnel exhaust gas 104 drawn by the fan 103 contains such components as $SO_2$, soot and dust in addition to the nitrogen oxides (NO and $NO_2$) as main components. As seen from the below-mentioned chemical formula (1), all the NO is oxidized into $NO_2$ by an ionizer 101, and $NO_2$ is absorbed by an absorbent such as $KNO_2$, $KNO_3$, $Ca(NO_2)_2$ and $Ca(NO_3)_2$ in an absorbent filter 102, as seen from chemical formula 2.

$$NO+O_3 \rightarrow NO_2+O_2,$$
$$NO+O^* \rightarrow NO_2. \qquad (1)$$

$$2NO_2+2KOH \rightarrow KNO_2+KNO_3+H_2O,$$
$$4NO_2+2Ca(OH)_2 \rightarrow Ca(NO_2)_2+Ca(NO_3)_2+H_2O. \qquad (2)$$

The important points in the aforementioned processes for oxidation control to maximize the denitrification rate of the denitrification system are as follows:

(1) To oxidize NO into $NO_2$ while mixing the oxidizing materials ($O_3$, $O^*$) commensurate with the ever-changing total amount (in mol) of the NO at the inlet.

(2) The oxidizing materials ($O_3$, $O^*$) are consumed by $SO_2$, dust and humidity as well as by the NO at the inlet of the denitrification system.

A configuration for oxidation control is shown in the block diagram of FIG. 16. In arithmetic controller 115, the total NO amount 118 at the inlet is calculated from the NO concentration value 116 at the inlet obtained from an NO concentration meter 113 installed as a detection part at or near the inlet of the denitrification system, and from gas flow rate 117 calculated by an anemometer 114. In a similar fashion, a total inlet $SO_2$ amount 124, a total inlet dust amount 126 and a total inlet humidity 128 are calculated from the output of an inlet $SO_2$ concentration meter 120, an inlet dust concentration meter 121 and an inlet humidity meter 122, installed at detection part at or near the inlet of the denitrification system. The total inlet NO amount 118, the total inlet $SO_2$ amount 124, the total inlet dust amount 126 and the total inlet humidity 128 are used to calculate and determine the oxidation amount 119 satisfying the formulae (1) and (2) described above. An open-loop control is employed in which the oxidation amount 119 is applied to the ionizer 101 as a control output. Whether the oxidation control is functioning properly or not is monitored by a residual NO concentration meter 129 and a post-oxidation residual $O_3$ concentration meter 130 at a point subsequent to the oxidation process shown in FIG. 15.

This conventional denitrification system is what is called the laboratory test system which displays its denitrification performance only by the use of prepared sample gas. When the actual tunnel exhaust gas is used, therefore, such a system cannot maintain a high denitrification rate. The problems to encounter when the tunnel exhaust is used with the conventional denitrification system are:

(1) The soot and dust in the tunnel exhaust is attached to the $NO_2$ absorbent filter 102. The $NO_2$ obtained is partially deoxidized to NO again with the carbon component of this dust as a catalyst. This deoxidized NO cannot be absorbed by the $NO_2$ absorbent filter 102, thereby to reduce the denitrification rate.

(2) The following problem is posed when NO in the tunnel exhaust is oxidized by the use of only the high-voltage discharge ionizer 101:

The NO concentration in the tunnel exhaust changes always. In order to oxidize the NO in accordance with ever-changing concentration, it is necessary to control the discharge current by changing the voltage applied to the high-voltage discharge ionizer 101 to control the oxidation of NO into $NO_2$. Discharge current control in the discharge region around the breakdown voltage of the exhaust gas, however, is unstable, and besides irresponsive, hence not easy. This is understood from the oxidation capability characteristic shown in FIG. 13. The discharge current control in the discharge region in the vicinity of the breakdown voltage of the exhaust gas is difficult since the rise of the characteristic is very steep. In addition, a spark is liable to occur, hence lowering denitrification rate.

NO is oxidized into $NO_2$ by using only the high-voltage discharge ionizer 101 having a discharge electrode directly contacting exhaust. Therefore, large power is consumed for oxidation.

(3) The humidity of the exhaust which is affected by the weather conditions changes between approximately 30% and 80%. When humidity at the inlet of the $NO_2$ absorbent filter 102 decreases below 60%, a reduction of denitrification rate would result.

Further, the following problem is posed by the control means for the denitrification system:

(1) In order to maximize the denitrification rate of a denitrification system, it is necessary that no NO exists after oxidation and all NO must be oxidized. When the concentration of the exhaust gas increases sharply and supply of oxidizing materials ($O_3$, $O^*$) from the ionizer becomes insufficient, NO remains unoxidized and is not absorbed by the absorbent, thereby decreasing the denitrification rate. The principal reason why the oxidizing materials become insufficient is that the equilibrium between oxidation of NO and reduction of $NO_2$ is disrupted, so that the optimum oxidizing condition for 100% oxidation from NO to $NO_2$ could not be determined under environments with always fluctuating $SO_2$, dust and humidity as interfering gases. As a result, excessive oxidizing materials are unavoidably supplied by open-loop control, with the result that the running cost of the oxidizing system increases and the service life of the absorbent is adversely affected.

(2) In spite of the many detection terminals used by for the inlet NO, inlet $SO_2$, inlet dust or inlet humidity for denitrification, the conventional control device cannot control the oxidation completely as explained in (1). The denitrification rate of the conventional system therefore was low.

SUMMARY OF THE INVENTION

The primary object of the invention is to solve the above-mentioned problems and provide a denitrification system wherein (i) the dust which otherwise would reduce the denitrification rate is preliminarily removed, (ii) the oxidizing ability is controlled stably even when the NO concentration of the exhaust gas to be processed changes, and (iii) the system is superior in the oxidation power efficiency.

According to one aspect of the present invention, there is provided a denitrification system which, in addition to the primary object of the denitrification system described above, does not lose in the $NO_2$ purification ability of the $NO_2$ absorbent filter even when the humidity of the exhaust gas at the inlet of the denitrification system decreases.

According to the present invention, there is provided a denitrification condition wherein optimum oxidizing condition for 100% oxidation from NO to $NO_2$ was achieved by disrupting the equilibrium between NO and $NO_2$ required for maintaining a high denitrification rate. As a result, optimum oxidizing conditions can be realized without supplying an excessive oxidizing material under the environmental conditions of humidity, dust and $SO_2$ existing as interfering gases constantly changing in concentration.

According to the present invention, the denitrification system has an improved response characteristics with sharp changes of concentration at the inlet of the denitrification system.

In order to achieve the primary object of the invention, the denitrification system in accordance with the present invention comprises an electrostatic precipitator (hereinafter referred to as E.P.) installed in the foremost stage of the inlet of the denitrification system, an ozonizer for generating ozone required for oxidizing NO into $NO_2$, an ozone supply nozzle installed in the stage immediately subsequent to the E.P., an agitator (the word agitator is used to include a fan) installed in the stage immediately subsequent to the ozone supply nozzle, and an $NO_2$ absorbent filter installed in the stage immediately subsequent to the fan or the agitator.

The denitrification system described above may further comprise a humidifier interposed between the ozone supply nozzle and the $NO_2$ absorbent filter, a humidity sensor installed in the stage subsequent to the humidifier, and a humidity controller.

Furthermore, the denitrification system described above may include an ozonizer for oxidizing the NO in the tunnel exhaust gas into $NO_2$, a fan for drawing the tunnel exhaust gas, and an $NO_2$ absorbent filter for absorbing the $NO_2$ obtained by oxidation, whereby the oxidation is controlled by feeding back the residual $O_3$ concentration after oxidation.

The denitrification system according to the present invention may further include feedforward control means having the function of predicting amount of change of oxidation.

According to the invention, the E.P. installed in the foremost stage of the inlet of the denitrification system removes the soot and dust, thereby preventing the reduction of denitrification rate which otherwise might be caused by the soot and dust attaching to the $NO_2$ absorbent filter. Further, by enhancing the electric field of the ionizer in the E.P., the E.P. can perform a discharge oxidation function which provides a base for oxidizing NO into $NO_2$ on top of the function of dust collection. Also, when mere base discharge oxidation by the E.P. is insufficient for oxidation and the changing NO concentration at the inlet of the denitrification system for controlling the system to make an appropriate oxidation, an ozonizer may be preferably installed for NO oxidation.

The ozone generated by the ozonizer is mixed with the tunnel exhaust through the ozone supply nozzle. The ozone supply nozzle is installed in the stage immediately subsequent to the E.P. before the fan or the agitator, whereby the ozone issued from the ozone supply nozzle is prevented from being deoxidized to oxygen by the high-concentration dust. Also, the issued ozone can be fully mixed with the exhaust by the agitating operation of the fan blade or the agitator. In other words, since the oxidation from NO to $NO_2$ by ozone can be certainly performed, the $NO_2$ obtained by oxidation can be absorbed by the $NO_2$ absorbent filter.

As explained above, by detecting a change in the exhaust gas humidity at the inlet side of the denitrification system by the front-stage humidity sensor, a feedback control is effected so that the humidifier performs the optimal humidification. When this humidifier is installed in the stage before the ozone supply nozzle, ozone is supplied to the exhaust whose humidity has been increased by the humidifier. As a consequence, such proportion of the ozone that is consumed by the humidity without being used for oxidizing NO increases for oxidation, thereby to decrease the electric power efficiency. The humidifier therefore must be installed in the stage subsequent to the ozone supply nozzle on the one hand, and for the purpose of humidification, it must be in the pre-stage of the $NO_2$ absorbent filter on the other hand. In other words, the most effective humidification is achieved by installing the humidifier between the ozone supply nozzle and the subsequent $NO_2$ absorption filter.

As described above, the denitrification system is configured to monitor the residual $O_3$ after oxidation process always without being influenced by the total NO amount, total $SO_2$ amount, total dust amount or humidity at the inlet of the system. The residual $O_3$ concentration after oxidation is controlled by feedback oxidation in such a way when the residual ozone concentration is lower than a specified region, the oxidation amount of the ozonizer is increased, and vice versa, thereby to achieve a high denitrification rate.

Further in concrete, this system can be configured as described below.

(i) The change $\Delta NO$ of varied NO amount during $\Delta t$ seconds is added to the real-time present value of total NO amount without being influenced by sharp changes in the total NO amount, total $SO_2$ amount, total dust amount and or humidity at the inlet of the denitrification system, (ii) a base oxidation amount is calculated from the value $NO+\Delta NO$ (i.e., the total NO amount plus a predicted amount of change), and (iii) the base oxidation amount is corrected by the residual $O_3$ concentration after oxidation, thereby to control the oxidation amount of the ozonizer. That is, the oxidation is controlled mainly with the feedforward control and auxiliarily with the feedback corrective control. Thus, a high denitrification rate is achieved.

As will be described in the below-mentioned embodiments, the E.P. in accordance with the invention removes dust which interferes with the oxidation, and an ozonizer easily controls amount of supplied ozone required for oxidizing the NO into $NO_2$ through the ozone supply nozzle.

Since a humidifier is added to a denitrification system, even when the exhaust gas humidity undergoes a change at the inlet of the denitrification system, the humidity is controlled so that the humidity at the inlet of the $NO_2$ absorbent filter is within a predetermined region. Thereby, a denitrification system provided in accordance with the present invention stably achieves a high denitrification rate.

The invention provides a method of controlling the denitrification system comprising an oxidizer for oxidizing the NO in tunnel exhaust gas into $NO_2$, a fan for drawing the tunnel exhaust gas, and an $NO_2$ absorbent filter for absorbing the $NO_2$ obtained by oxidation. And therein the oxidation is controlled by feeding back with the residual $O_3$ concentration after oxidation, thereby providing a denitrification system with a high denitrification rate.

Also, there is provided a denitrification system wherein means for controlling the denitrification system further comprises feedforward control means capable of tracking the oxidation stably and having the function of predicting the varied amount of the oxidation even when total NO amount, total $SO_2$ amount, total dust amount or humidity undergoes a sudden change at inlet of the denitrification system.

It will be recognized that some or all of the Figures are schematic representations for purposes of illustration and do not necessarily depict the actual relative sizes or locations of the elements shown.

DESCRIPTION OF THE PREFERRED EMBODIMENTS

First Embodiment

Figure 1:
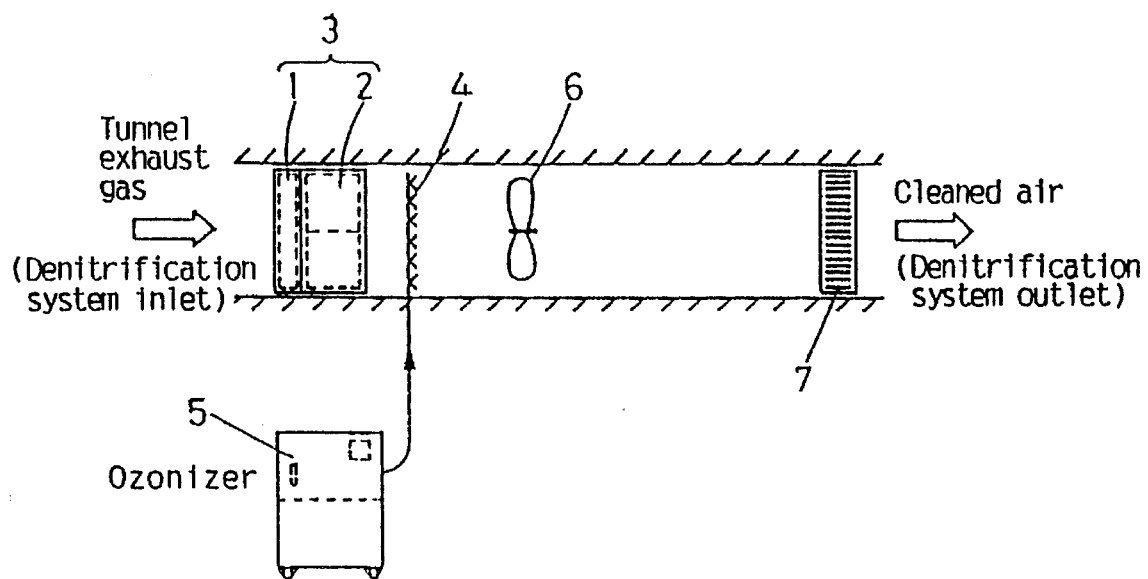
FIG. 1 is a general sectional side view showing a system configuration of a denitrification system in accordance with a first embodiment of the invention.

A first embodiment of the invention will be explained with reference to FIG. 1. A denitrification system in accordance with this invention, as shown in FIG. 1, comprises an E.P. 3 installed in the foremost stage at the inlet of the denitrification system, an ozonizer 5 for generating ozone required for oxidizing NO into $NO_2$, an ozone supply nozzle 4 installed in the stage immediately subsequent to the E.P. 3, a fan or an agitator 6 installed in the stage immediately subsequent to the ozone supply nozzle 4, and an $NO_2$ absorbent filter 7 including activated carbon and at least one of the alkali materials such as NaOH, KOH, $Ca(OH)_2$ and $Ba(OH)_2$.

The E.P. 3 located at the foremost stage of the inlet of the denitrification system removes the dust and therefore prevents the reduction in denitrification rate, which otherwise might be caused by the dust attaching to the $NO_2$ absorbent filter 7. Further, the electric field intensity of the ionizer 1 in the E.P. 3 is increased to a strong field of 8.5 kV/cm, i.e., or about one and half times the electric field strength for the prior art. And the voltage applied to the ionizer 1 is of negative voltage which has more oxidation effect than the positive voltage application. At the same time, the voltage applied to the collector 2 in E.P. 3 is made negative voltage application. More specifically, by the selection of the negative voltage application for the voltage applied to the ionizer 1, the E.P. 3 has a function of discharge oxidation for making up a base for oxidizing a part of NO besides collection of the dust. (It is necessary, however, that the voltage applied to the ionizer 1 must be constant in order to secure stability of discharge oxidation.)

Figure 2:
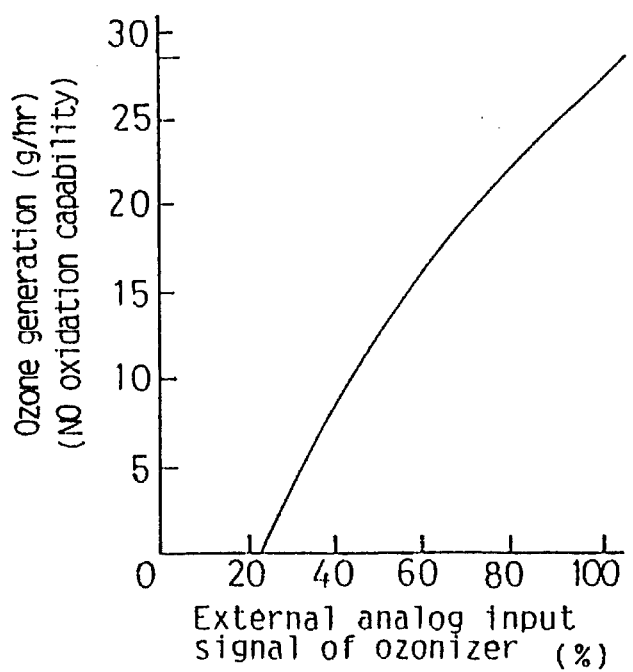
FIG. 2 is a graph showing an oxidation capability characteristic of an ozonizer.
Figure 13:
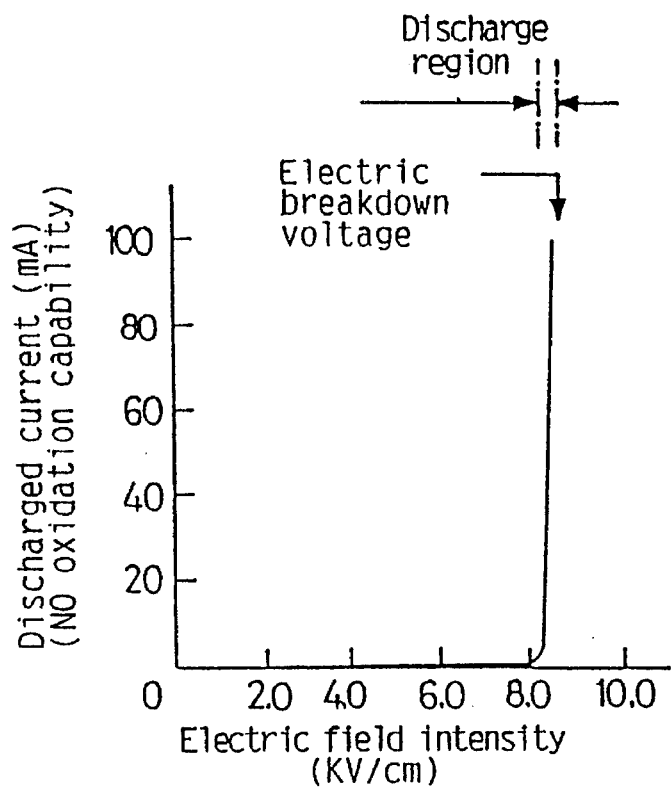
FIG. 13 is the graph showing the characteristic of a general high-voltage discharge oxidation capability of ionizer.

The mere base discharge oxidation by the E.P. described above is insufficient from the viewpoint of oxidation capability, and the oxidation cannot be controlled for the changing NO concentration at the inlet of the denitrification system. Therefore, in order to assure a sufficient NO oxidation an ozonizer 5 is provided in the apparatus. This ozonizer 5 supplies the ozone in an amount required for oxidizing NO remaining in the exhaust gas into $NO_2$ through the ozone supply nozzle 4 by adjusting the amount by analog variable control. FIG. 13 shows the oxidation capability characteristic of a conventional high-voltage discharge ionizer; and FIG. 2 shows the oxidation capability characteristic of the ozonizer 5 in accordance with the embodiment under consideration. That the ozonizer oxidation control according to the embodiment is much easier than the high-voltage discharge oxidation control in accordance with the prior art is clearly understood, by comparing the rise of the high-voltage discharge oxidation capability characteristic shown in FIG. 13 with the rise of the ozonizer oxidation capability characteristic shown in FIG. 2, which is a characteristic graph of one example of ozonizer. Also, since the electric power efficiency for oxidation can be improved over the conventional high-voltage discharge ionizer, the running cost of the denitrification system as a whole can be reduced. The ozone generated by the ozonizer is mixed with the exhaust through the ozone supply nozzle 4. The ozone supply nozzle 4 is required to be installed in the stage immediately subsequent to the E.P. 3 and immediately preceding the fan or the agitator 6.

As a result of this arrangement, the ozone discharged from the ozone supply nozzle 4 is less reduced to oxygen by the high-concentration dust. Also, the ozone discharged from the ozone supply nozzle 4 can be fully mixed with the actual gas by the agitation effect of the fan or the agitator. In other words, the oxidation reaction from NO to $NO_2$ by ozone can be surely performed, and $NO_2$ obtained by oxidation can be absorbed by the $NO_2$ absorbent filter 7. The result of an experiment shown in Table 1 indicates that the arrangement of ozone supply nozzle 4 arranged between the E.P. 3 and the fan or the agitator 6 represents the highest denitrification rate and is most effective.

TABLE 1

| Installation position of ozone suply nozzle | Denitrification rate (average) (%) |
|---|---|
| Between E.P. 3 and fan or agitator 6 (embodiment 1) | 72 |
| In the stage before E.P. 3 | 70 |
| Between fan or agitator 6 and $NO_2$ absorbent filter 7 | 68 |

In this way, in a denitrification system according to the first embodiment of the invention, the dust causing the reduction in denitrification rate is removed by the E.P. Therefore, the oxidation is controlled by the ozonizer oxidation system, which is easy to control and highly effective on electric power efficiency for oxidation, thereby making it possible to maintain a high denitrification rate.

Figure 14:
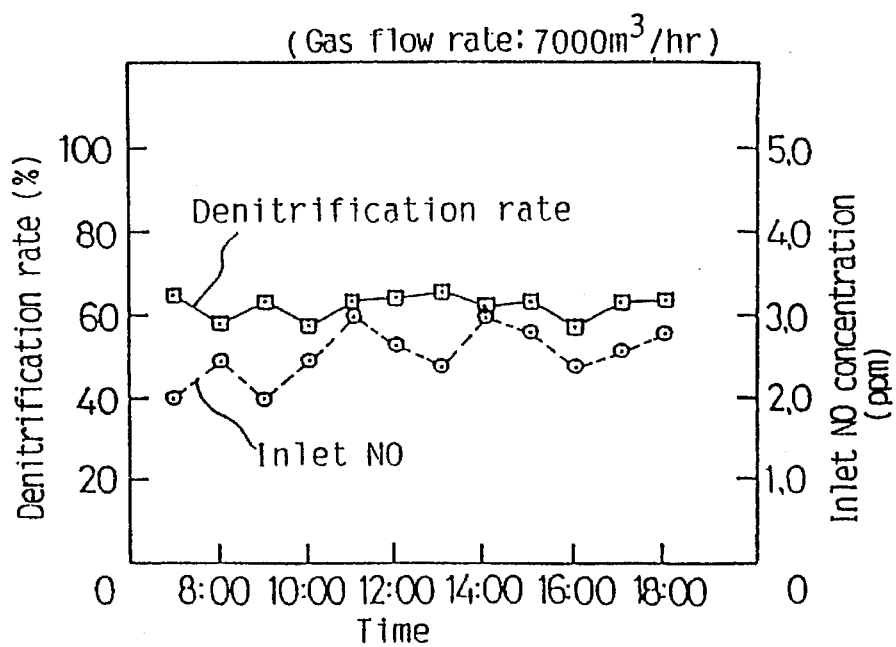
FIG. 14 is the graph showing he relation between inlet NO concentration and denitrification rate.
Figure 15:
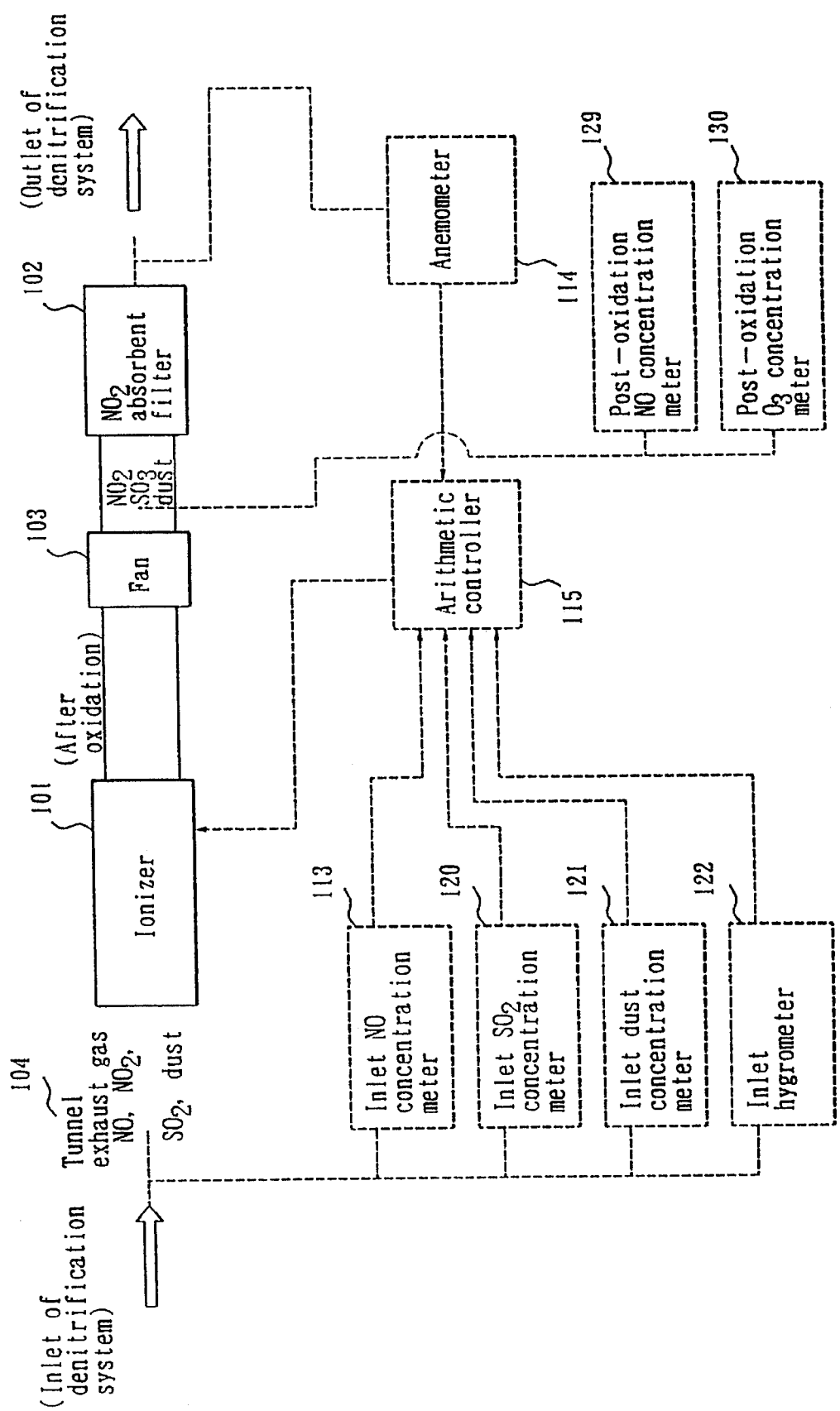
FIG. 15 is the schematic side view with related circuit blocks of the system configuration of a second conventional denitrification system.
Figure 16:
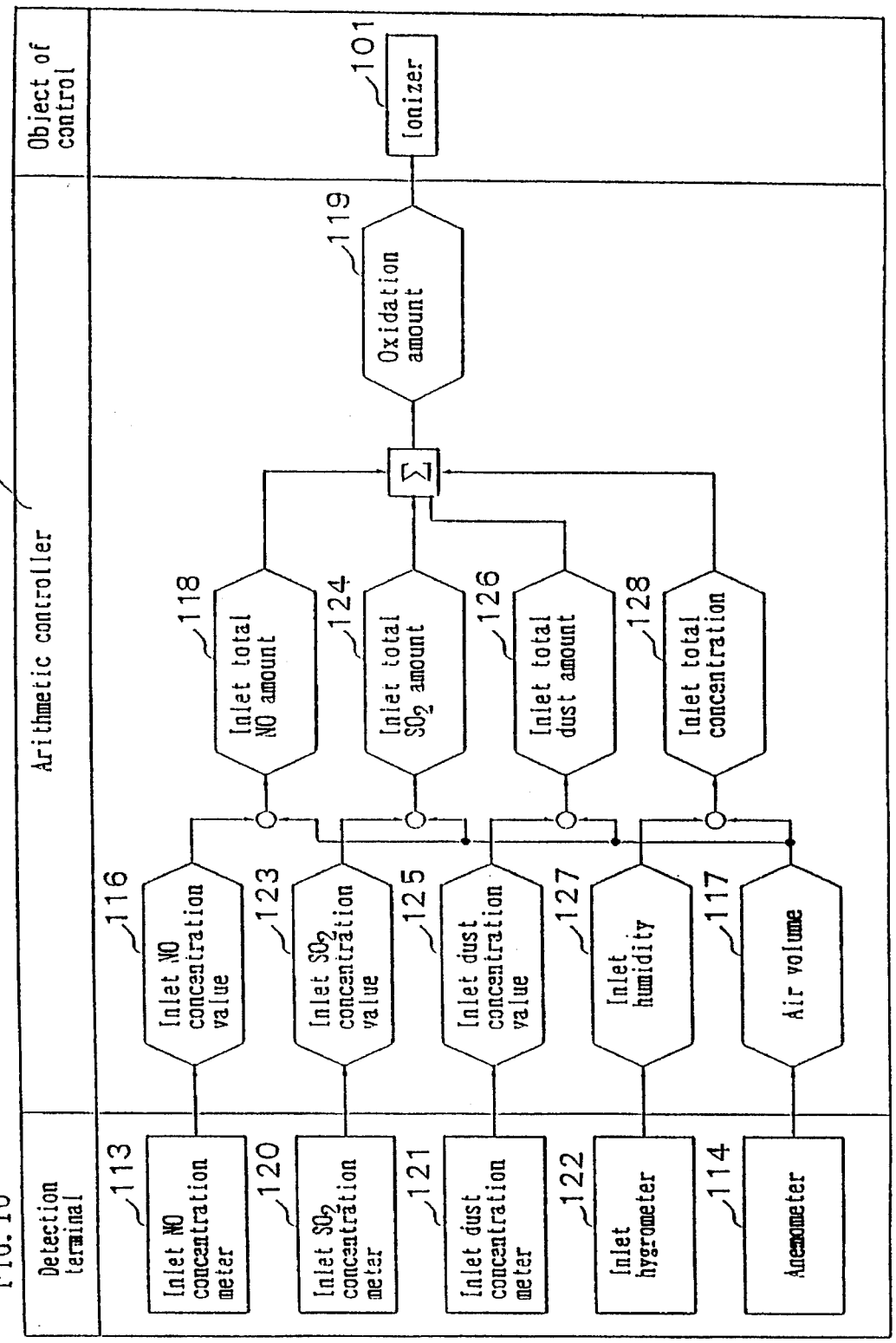
FIG. 16 is the block diagram showing control operation flow of the same conventional system.

The conventional denitrification system first mentioned above and the denitrification system according to the first embodiment were installed in an actual road tunnel and their denitrification performance was compared with each other. The result of comparison is as follows:

FIG. 14 shows the case of a conventional denitrification system. When the NO concentration at the inlet of the denitrification system varies, the oxidation control cannot smoothly follow the variation and the denitrification rate also undesirably changes. Also, the reduction due to the dust attached to the $NO_2$ absorbent filter 7 reduces the purification performance of the $NO_2$ absorbent filter 7. As a result, the average value of the denitrification rate stands as low as 63%.

Figure 3:
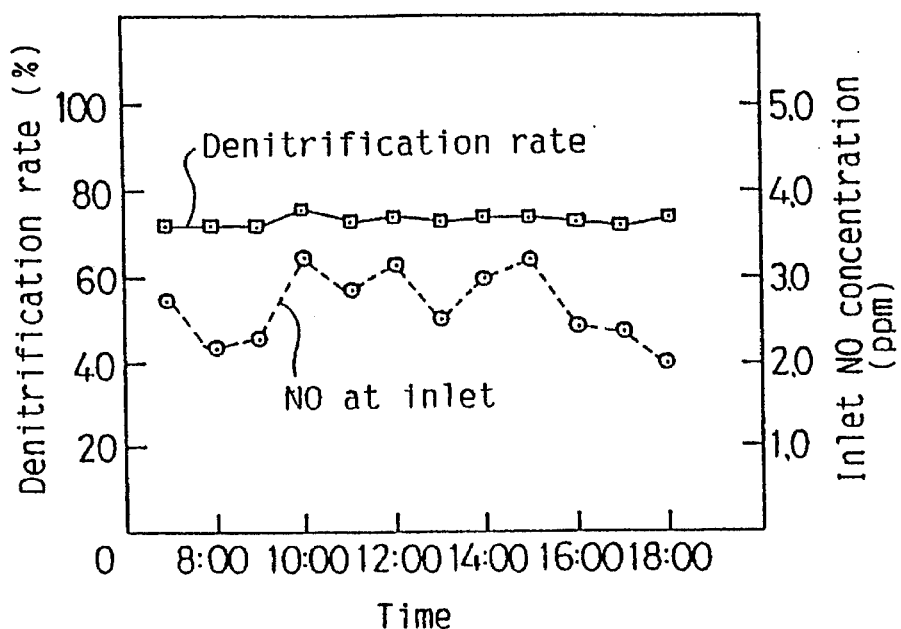
FIG. 3 is a graph showing a relation between the inlet NO concentration and denitrification rate.
Figure 4:
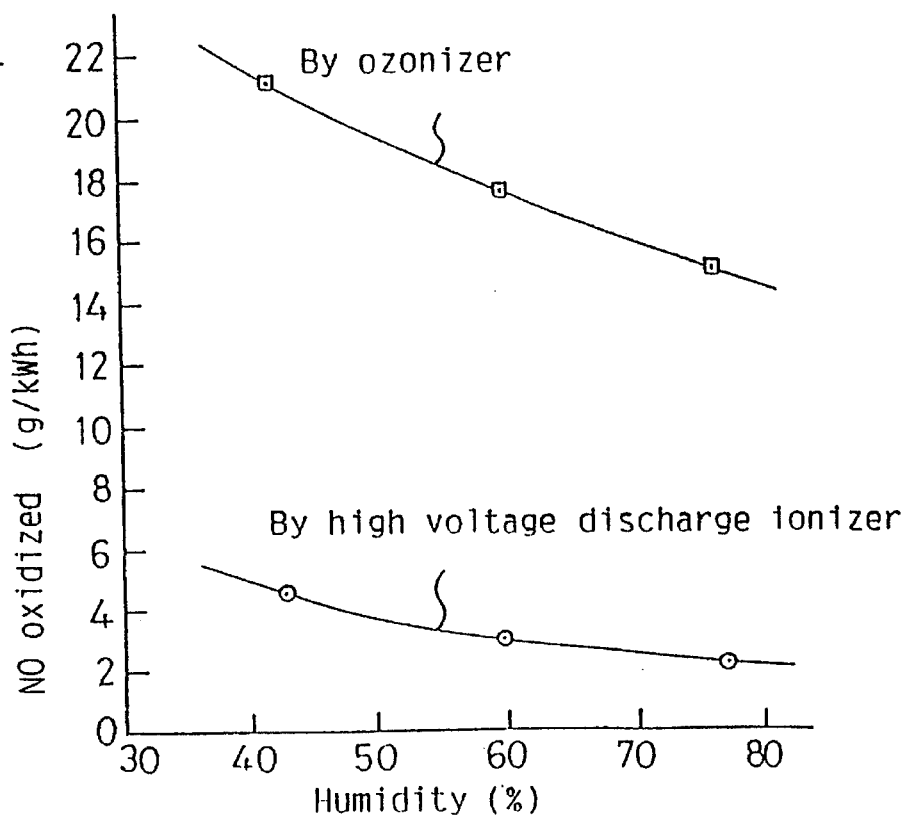
FIG. 4 is a graph showing electric power efficiency characteristic for oxidation.

In contrast, the denitrification system according to the first embodiment shown in FIG. 3 exhibits a stable denitrification rate with the change in NO concentration at the system inlet. The average denitrification rate was as high as 72%, clearly indicating an improved denitrification rate. Also, the ozonizer oxidation control according to the first embodiment, as compared with the high-voltage discharge ionizer control according to the prior art, is far superior in oxidation power efficiency, as indicated from the experiment shown in FIG. 4. The configuration of the denitrification system described above thus leads to a system which maintains a high denitrification rate adapted to the actual gas.

Second Embodiment

Figure 5:
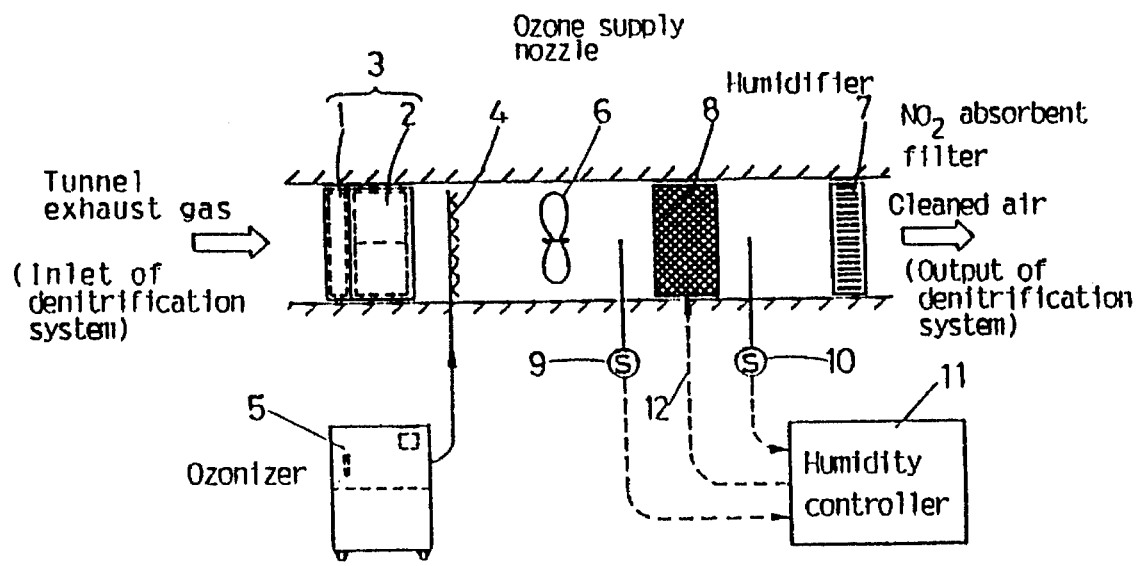
FIG. 5 is a sectional side view showing a system configuration of a denitrification system in accordance with a second embodiment of the invention.

Now, a second embodiment of the invention is explained with reference to FIG. 5. In addition to the component parts according to the first embodiment, the system under consideration comprises a humidifier 8 interposed between the ozone supply nozzle 4 and the $NO_2$ absorbent filter 7, a humidity sensor 9 installed in the stage immediately preceding the humidifier 8, a humidity sensor 10 installed in the stage immediately subsequent to the humidifier, and a humidity controller 11.

First, the basic operation of the invention will be explained. $NO_2$, when coupled with the moisture in the exhaust or when moisture is attached on the surface of the $NO_2$ absorbent filter 7, is easily absorbed by the porous $NO_2$ absorbent filter 7. Especially, the filter of a type containing a porous activated carbon as a component which absorbs $NO_2$ with an alkali material is greatly influenced by humidity. In other words, when the $NO_2$ absorption capability of the $NO_2$ absorbent filter 7 is of maximum degree, the humidity at the inlet of the $NO_2$ absorbent filter 7 is required to be maintained within the range of approximately 60 to 90%. As a result, as shown in FIG. 5, upon detection, by the humidity sensor, of a change in exhaust gas humidity at the inlet of the denitrification system, a humidification output control command 12 is issued from the humidity controller 11 to the humidifier so as to maintain the value on the humidity sensor 10 within a predetermined region. And the feedback control is effected to perform optimum humidification by the humidifier 8.

More specifically, when the humidity decreases at the inlet of the denitrification system the humidification output is intentionally increased to prevent the reduction in the performance of the $NO_2$ absorbent filter 7, while when the inlet humidity increases the humidification output is reduced thereby suppressing the running cost for humidification. In the case where this humidifier 8 is installed in the stage immediately preceding the ozone supply nozzle 4, ozone is supplied to the exhaust gas increased in humidity by humidification. The ozone therefore falls to be used for oxidation for NO, and the ozone is increasingly consumed by humidity, resulting in a reduced oxidation power efficiency. Consequently, the humidifier 8 is required to be installed in the stage subsequent to the ozone supply nozzle 4, and also, for the purpose of humidification it should be in the pre-stage of the $NO_2$ absorbent filter 7. The experiment result shown in Table 2 also indicates that the insertion of the humidifier 8 between the ozone supply nozzle 4 and the $NO_2$ absorbent filter 7 exhibits the highest denitrification rate and is most effective.

TABLE 2

| P Position of installation of humidifier | Denitrification rate (average) (%) |
|---|---|
| Between ozone supply nozzle 4 and $NO_2$ absorbent filter 7 | 81 |
| In the pre-stage of E.P. 3 | 78 |
| Between E.P. 3 and ozone supply nozzle 4 | 78 |

As explained in the above, according to the denitrification system of the present invention, even when the humidity decreases at the inlet of the denitrification system, the inlet humidity of the $NO_2$ absorbent filter 7 can be maintained to stay in a predetermined region (say, between 70 and 80%) by the use of the front humidity sensor 9, the rear humidity sensor 10 and the humidity controller 11. A high denitrification rate can thus be maintained.

Figure 6:
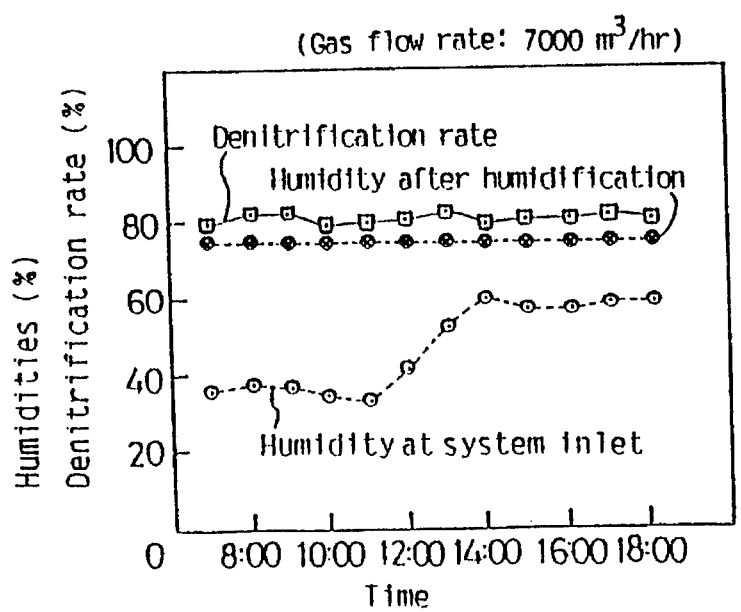
FIG. 6 is a graph showing the relation between humidity and denitrification rate.
Figure 12:
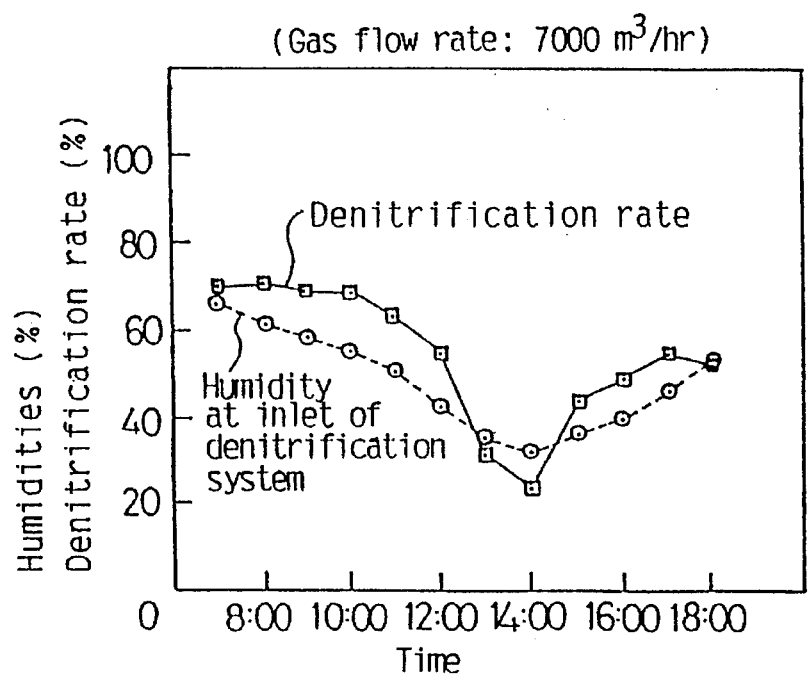
FIG. 12 is the graph showing the relation between humidity and denitrification rate of the first conventional denitrification system.

A conventional denitrification system and a denitrification system in accordance with the second embodiment were installed in an actual road tunnel for the purpose of comparing the denitrification performance; and the result thereof is reported hereunder. In FIG. 12 showing the case of a conventional denitrification system, a change in humidity at the inlet of the system changes the denitrification rate, so that the average denitrification rate is as low as 54%. In the case of the denitrification system in accordance with the second embodiment shown in FIG. 6, in contrast, the humidity after the humidification process is so stable against the humidity change at the inlet of the system that the average value thereof is a high 81%. This apparently indicates an improved denitrification performance. According to the above-mentioned configuration of a denitrification system, even when the humidity of the exhaust decreases, the optimum humidification by the humidifier 8 can maintain the appropriate performance of the $NO_2$ absorbent filter 7; thereby realizing a denitrification system of a high denitrification rate.

Third Embodiment

Figure 7:
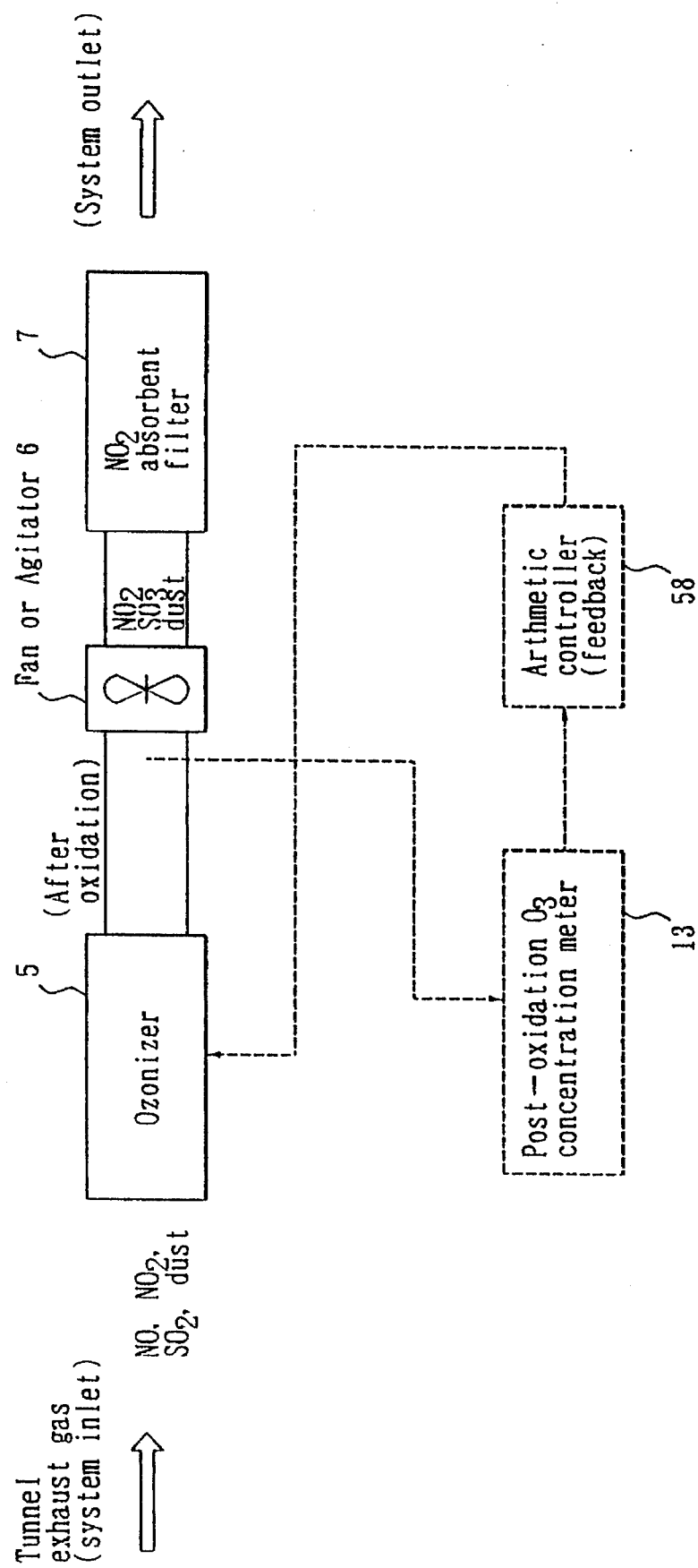
FIG. 7 is a block diagram showing a system configuration of a denitrification system in accordance with a third embodiment of the invention.
Figure 8:
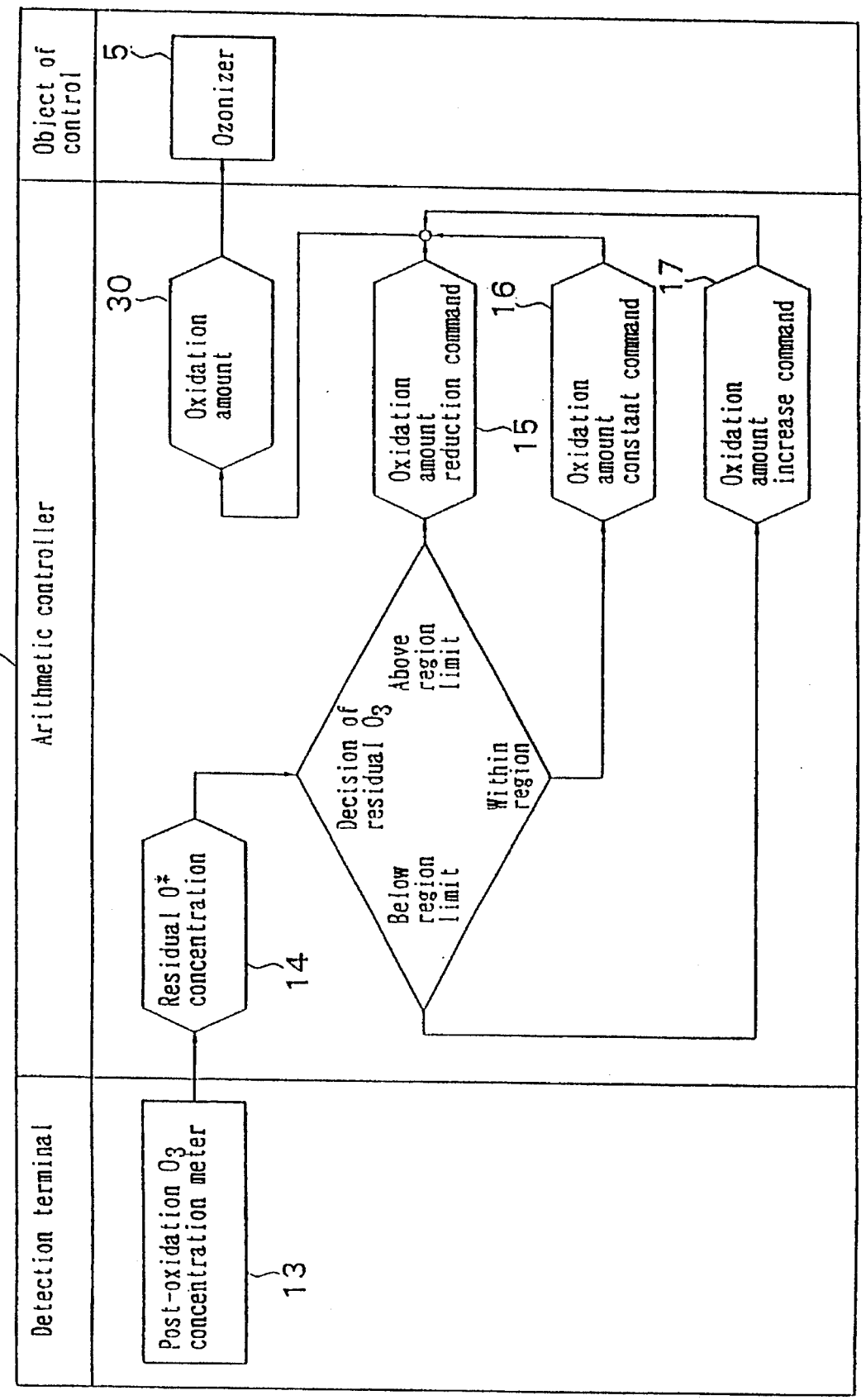
FIG. 8 is a block diagram for control operation flow of the third embodiment.

A third embodiment of the invention will be explained with reference to FIGS. 7 and 8. As shown in FIG. 7, a post-oxidation $O_3$ concentration meter 13 is provided after the oxidation process to the tunnel exhaust gas. In a method of control, as shown in FIG. 8, the residual $O_3$ concentration value 14 is calculated by an arithmetic controller 58 for feedback controlling, based on the residual $O_3$ concentration meter 13; and it is decided whether the residual $O_3$ concentration is within, above, or below a specified region. In the event that the residual $O_3$ concentration is the specified region, a constant oxidation amount command 16 is applied to the ozonizer 5 in its present form as an oxidation control output. In the case where the residual $O_3$ concentration is above the specified region, a reduced oxidation amount command 15 is issued; when the residual $O_3$ concentration is below the specified region, an increased oxidation amount command 17 is produced. Oxidation amount 30 calculated by these commands is employed as output to ozonizer 5.

As has been described, according to the oxidation control means for the denitrification system of the third embodiment of the invention, NO can be completely and optimally oxidized into $NO_2$ without being affected by the variations in the total NO amount, total $SO_2$ amount, total dust amount or humidity at the system inlet. And this can be made maintaining a high denitrification rate by feedback oxidation control through a very simple loop by using the arithmetic controller 58.

A denltrlflcatlon system including the oxidation control means in accordance with the third embodiment was installed in a road tunnel of comparatively stable traffic volume, and the denitrification rate was measured actually, whose data was compared with that for the conventional oxidation control means. The result is shown in Table 3. As will be seen from Table 3, the third embodiment is superior to the prior art in denitrification rate and can perform more accurate oxidation control.

TABLE 3

|  | Conventional control means | (Gas flow rate: 7.000 m³/h) Control means of third embodiment |
|---|---|---|
| Denitrification rate | 65% | 5% |

Fourth Embodiment

Figure 9:
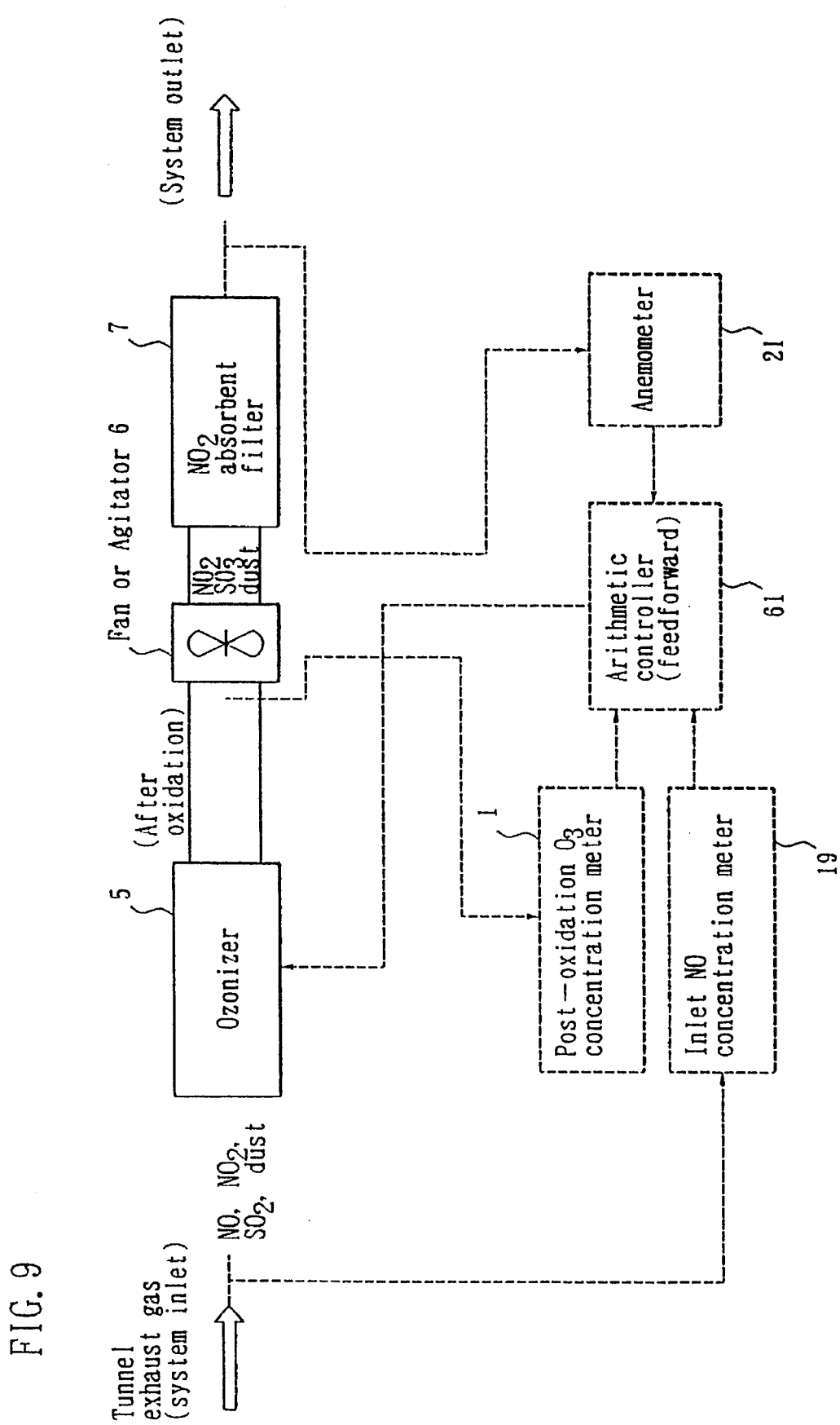
FIG. 9 shows a system configuration of a denitrification system according to a fourth embodiment of the invention.
Figure 10:
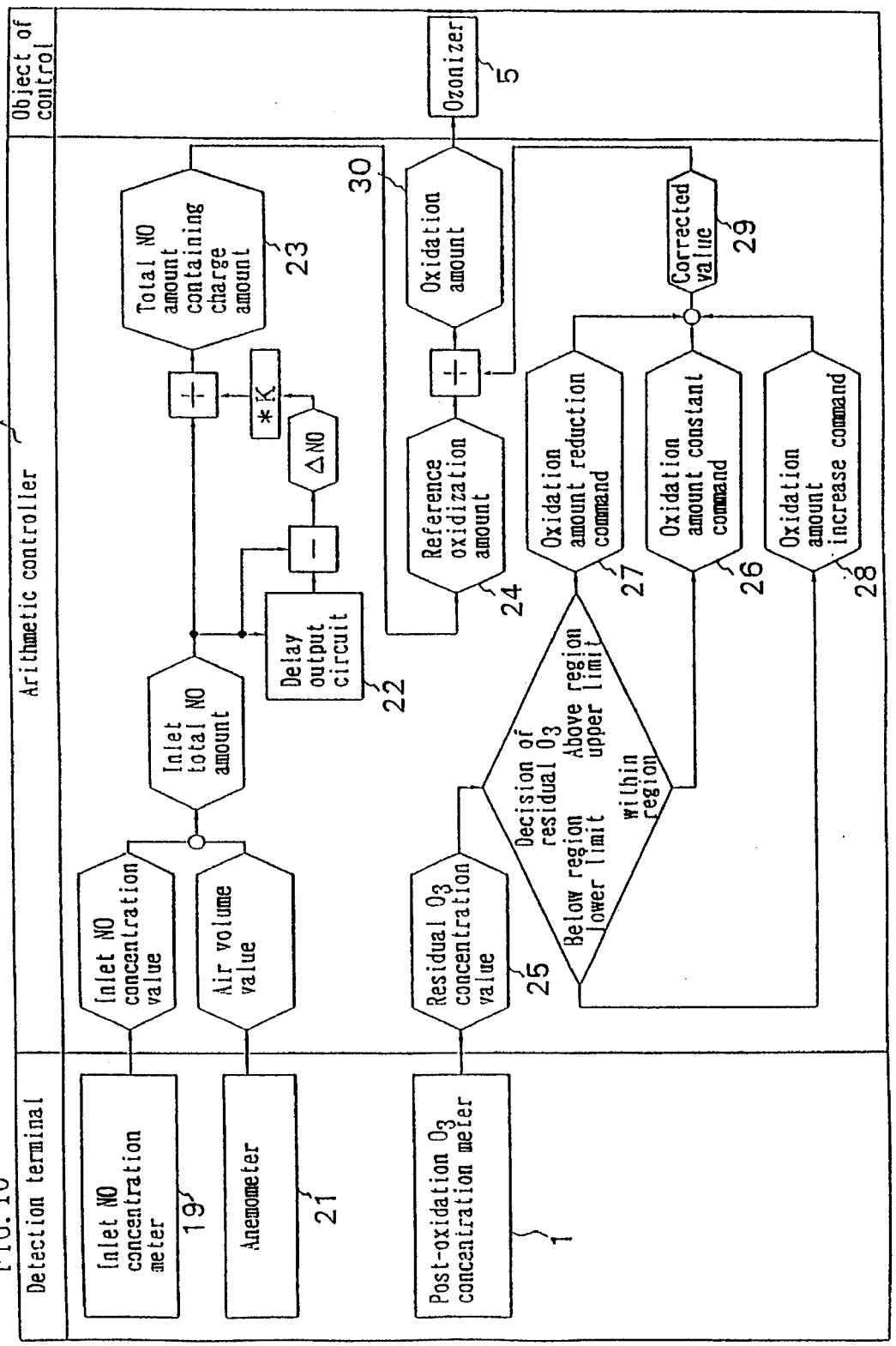
FIG. 10 is a block diagram for control operation flow of the fourth embodiment.
Figure 11:
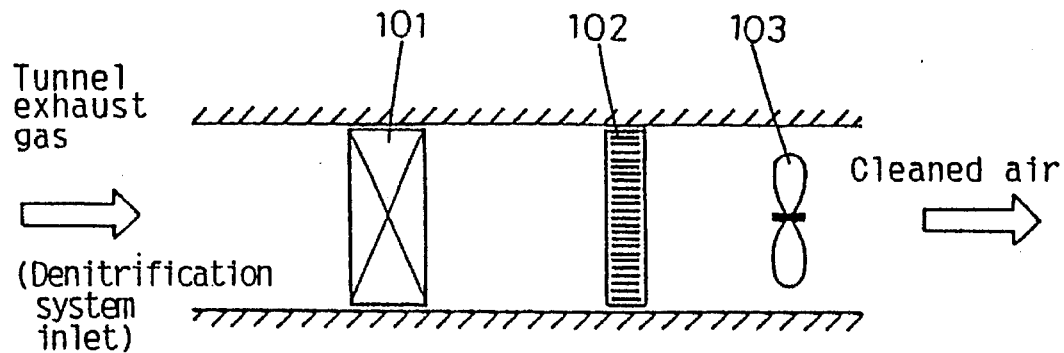
FIG. 11 is the general sectional side view showing the system configuration of a first conventional denitrification system.

Now, a fourth embodiment of the invention will be explained with reference to FIGS. 9 and 10. As shown in FIG. 9, the embodiment under consideration comprises an NO concentration meter 19 at the inlet of the denitrification system, a post-oxidation $O_3$ concentration meter 1 after the oxidation process and an anemometer 21 at the outlet of the system. A method of control of this system is shown in FIG. 10. In the feedforward control providing the principal method of control, the total inlet NO amount is calculated from the inlet NO concentration meter 19 and the anemometer 21 by an arithmetic controller, which controls principally by feedforward controlling and auxiliarily by feedback controlling. This total inlet NO amount is passed through a delay output circuit 22 after a delay time of Δt seconds. In this way, the amount of NO variation ΔNO after Δt seconds is determined. The NO variation amount thus obtained is multiplied by a correction factor K and the resultant value is added to the total inlet NO amount. This is assumed to be a total NO amount 23 containing the predicted change amount at Δt after the present time, and is used to determine by calculation a base oxidation amount 24 immediately.

With regard to the subsidiary feedback correction control, in contrast, the residual $O_3$ concentration value 25 is calculated by the post-oxidation $O_3$ concentration meter 20 to decide whether the residual $O_3$ concentration is included within, above or below the limit of the specified region. In the case where the residual $O_3$ concentration is within the specified region, the oxidation control output is produced on a constant oxidation amount command 26 as at present, while when the residual $O_3$ concentration is above the upper limit an oxidation amount reduction command 27 is issued. Also, when the residual $O_3$ concentration is below the lower limit of the region, an oxidation amount increase command 28 is produced. This oxidation amount increase or decrease (or constant) command is added to the above-mentioned base oxidation amount 24 as a correction value 29, and the resulting value is applied to the ozonizer 5 as a final oxidation amount command 30.

In this way, in the oxidation control means for a denitrification system of the fourth embodiment of the invention, NO can be completely and optimally oxidized into $NO_2$ by a simple feedforward oxidation control by using the arithmetic controller 61 without being affected by abrupt changes in the total NO amount, total $SO_2$ amount, total dust amount or humidity at the inlet of the denitrification system; and thereby a high denitrification rate is maintained.

Table 4 shows the actual measurement of denitrification rate for a denitrification system comprising the oxidation control means in accordance with the fourth embodiment installed in a road tunnel subjected to sharp changes in traffic volume with time. As seen from Table 4, the fourth embodiment has a denitrification rate improved over the prior art, and therefore is capable of more accurate oxidation control.

TABLE 4

|  | Conventional control means | (Gas flow rate 7000 m³/h) Control means of fourth embodiment |
|---|---|---|
| Denitrification rate | 65% | 85% |

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A system for denitrification of exhaust gas comprising:

an inlet for receiving exhaust gas, an electrostatic precipitator (3) installed in a foremost stage of said inlet, an ozone supply nozzle (4) installed in a stage immediately subsequent to said electrostatic precipitator (3) for feeding ozone from an ozonizer (5)

an ozonizer (5) having a substantially proportional input pulse frequency vs. generated ozone amount characteristic for generating ozone for oxidizing NO into $NO_2$, a fan or an agitator (6) installed in a stage immediately subsequent to said ozone supply nozzle (4) for drawing said exhaust gas into said inlet, an $NO_2$ absorbent filter (7) installed in a stage subsequent to said fan or agitator (6), a humidifier (8) installed between the ozone supply nozzle (4) and said $NO_2$ absorbent filter (7), a humidity sensor (9) installed between the ozone supply nozzle (4) and said humidifier (8), a humidity sensor (10) installed between said humidifier (8) and said $NO_2$ absorbent filter (7) and a humidity controller (11) connected to said humidity sensors (9, 10) and said humidifier (8) for controlling humidity in said exhaust gas within a predetermined range.

* * * * *